United States Patent
Kim et al.

(10) Patent No.: US 11,036,818 B2
(45) Date of Patent: Jun. 15, 2021

(54) METHOD AND SYSTEM FOR DETECTING GRAPH BASED EVENT IN SOCIAL NETWORKS

(71) Applicant: Chungbuk National University Industry—Academic Cooperation Foundation, Cheongju-si (KR)

(72) Inventors: Ina Kim, Cheongju-si (KR); Jongtae Lim, Cheongju-si (KR); Kyoungsoo Bok, Sejong-si (KR); Jaesoo Yoo, Cheongju-si (KR)

(73) Assignee: CHUNGBUK NATIONAL UNIVERSITY INDUSTRY-ACADEMIC COOPERATION FOUNDATION, Chungcheongbuk-do (KR)

( * ) Notice: Subject to any disclaimer, the term of this patent is extended or adjusted under 35 U.S.C. 154(b) by 325 days.

(21) Appl. No.: 16/222,759

(22) Filed: Dec. 17, 2018

(65) Prior Publication Data
US 2020/0089723 A1 Mar. 19, 2020

(30) Foreign Application Priority Data
Sep. 19, 2018 (KR) ........................ 10-2018-0112353

(51) Int. Cl.
*G06F 16/9536* (2019.01)
*G06F 16/2457* (2019.01)
(Continued)

(52) U.S. Cl.
CPC .... *G06F 16/9536* (2019.01); *G06F 16/24578* (2019.01); *G06F 16/285* (2019.01); *G06F 16/9024* (2019.01)

(58) Field of Classification Search
CPC .......... G06F 16/9536; G06F 16/24578; G06F 16/285; G06F 16/9024; G06F 16/322; G06F 16/313; G06Q 50/01; G06Q 10/10
(Continued)

(56) References Cited

U.S. PATENT DOCUMENTS 7,809,548 B2 * 10/2010 Mihalcea .............. G06F 40/284
704/1
9,286,391 B1 * 3/2016 Dykstra .............. G06F 16/9024
(Continued)

FOREIGN PATENT DOCUMENTS

| KR | 10-1173789 | 8/2012 |
| KR | 10-1691576 | 12/2016 |
| KR | 10-2017-0140085 | 12/2017 |

OTHER PUBLICATIONS

Borges et. al. "Advances in Event Detection". 2017. IEEE. 2017 IEEE International Conference on Internet of Things (iThings) and IEEE Green Computing and Communications (GreenCom) and IEEE Cyber, Physical and Social Computing (CPSCom) and IEEE Smart Data (SmartData). pp. 1017-1024. (Year: 2017).*
(Continued)

*Primary Examiner* — Michael Pham
(74) *Attorney, Agent, or Firm* — Holzer Patel Drennan

(57) ABSTRACT

Provided is a method and system for detecting a graph-based event in a social network, the method including generating a keyword graph based on social data collected from a social network system; separating the keyword graph into a plurality of candidate graphs through clustering; calculating a user interest for each of the plurality of candidate graphs based on a per-time variation of a social action associated with the social data; and determining k candidate graphs from among the plurality of candidate graphs as an event graph based on the user interest. Here, k denotes a natural number.

11 Claims, 13 Drawing Sheets

(51) Int. Cl.
    G06F 16/28      (2019.01)
    G06F 16/901     (2019.01)
(58) Field of Classification Search
    USPC .................................................. 707/730, 737
    See application file for complete search history.

(56) References Cited

U.S. PATENT DOCUMENTS

| 9,836,183 B1* | 12/2017 | Love | G06F 16/9024 |
| 2015/0120717 A1* | 4/2015 | Kim | G06F 16/335 |
| | | | 707/727 |
| 2018/0103052 A1* | 4/2018 | Choudhury | H04L 63/1416 |

OTHER PUBLICATIONS

Katragadda et. al. "Detection of Event Onset Using Twitter". 2016. IEEE. 2016 International Joint Conference on Neural Networks (IJCNN). pp. 1539-1546. (Year: 2016).*

Amosse Edouard, Elena Cabrio, Sara Tonelli, Nhan Le Thanh. Graph-based Event Extraction from Twitter. RANLP17—Recent advances in natural language processing, Jul. 2017, Varna, Bulgaria. 2017. <hal-01561439>.

Adrien Guille and Cecile Favre. Event Detection, Tracking and Visualization in Twitter: A Mention-anomaly-based Approach. May 2015, Social Network Analysis and Mining, vol. 5, pp. 1-18.

Mario Cataldi, Luigi Di Caro, Claudio Schifanella. Emerging Topic Detection on Twitter based on Tempral and Social Terms Evaluation, Jul. 25, 2010, MDMKDD.

Satya Katragadda, Ryan Benton. Framework for Real-Time Event Detection using Multiple Social Media Sources, Proceedings of the 50$^{th}$ Hawaii International Conference on System Sciences, 2017.

Ina Kim, Indeok Seo, Kyunam Lee, Jihwan Ahn, Jongtae Lim, Kyungsoo Bok, Jaesoo Yoo. Event Location Inference Scheme Considering Users' Relationships in Social Networks, International Conference on Convergence Content, Dec. 9-12, 2017.

Ina Kim, Minyoung Kim, Jihwan Ahn, Jongtae Lim, Kyungsoo Bok, Jaesoo Yoo. Graph-based Event Detection Scheme in Social Network, 2017 Korea Software Congress, Dec. 20, 2017.

Ina Kim, Jongtae Lim, Kyuongsoo Bok, Jaesoo Yoo. Event Detection Scheme Considering User Interests in Social Networks, Proceedings of the Korea Contents Association Conference, 2018.

Ina Kim, Minyoung Kim, Jongtae Lim, Kyuongsoo Bok, Jaesoo Yoo. Graph-based Event Detection Scheme Considering User Interest in Social Networks, Journal of the Korea Contents Association, 18(7), 2018, pp. 449-458.

Kim, Byeongsun et al., "Global Research Trends on Geospatial Information by Keyword Network Analysis," Journal of Korea Spatial Information Society vol. 23, No. 1 : 69-77, Feb. 2015.

* cited by examiner

[#Pohang earthquake] collapsed and destroyed...

The earthquake, measuring magnitude 5 on the moment magnitude scale, struck Pohang, North Gyeongsang Province, at 2:29PM, and caused infrastructure damage, collapsing of building walls.
http://omn.kr/oluj

(ii)

Pohang earthquake collapsed and destroyed.

The earthquake, measuring magnitude 5 on the moment magnitude scale, struck Pohang, North Gyeongsang Province, at 2:29PM, and caused infrastructure damage, collapsing of building walls.

(iii)

Pohang, earthquake, collapse, destroy, measuring, magnitude, 5, moment magnitude scale, struck, Pohang, North Gyeongsang, Province, 2:29, PM, cause, infrastructure, damage, building, walls.

FIG. 5

---
Algorithm 1. Event Clustering Algorithm

---

Input :
   Graph G = (V, E), undirected;
   removalSet;
Output : A set of event clusters EC = {$EC_1$, $EC_2$, ..., $EC_n$};

set removalSet, EC ← Φ topicVertex ← argmax($C^b_{vertex}$);
if $distance_{i \in V}$(topicVertex, i) > 2 then
   Add vertex i to removalSet;
end if
for all e ∈ E :
   calculate Edge Betweenness Centrality $C^b_{edge}$ ;
   if ∃$C^b_{edge}$ > (m+2σ) then
      cut edge $e_i$ with argmax($C^b_{edge}$);
      copy vertex $v_i$ , $v_j$ to each vertex with edge $e_k$;
   else
      if topicVertex, removalSet in same cluster then
         remove vertex in removalSet
      else
         set removalSet, EC ← Φ
      end if
   end if
end for
return event clusters EC = {$EC_1$, $EC_2$, ..., $EC_n$}

---

610

METHOD AND SYSTEM FOR DETECTING GRAPH BASED EVENT IN SOCIAL NETWORKS

CROSS-REFERENCE TO RELATED APPLICATION(S)

This application claims the priority benefit of Korean Patent Application No. 10-2018-0112353 filed on Sep. 19, 2018, in the Korean Intellectual Property Office, the disclosure of which is incorporated herein by reference for all purposes.

BACKGROUND

1. Field

One or more example embodiments relate to a technology for detecting an event, for example, a topic, based on a graph in a social network environment, and more particularly, to enhancing accuracy of event detection based on a user interest.

2. Description of Related Art

In the related art, a method of detecting an event, for example, a topic, based on a word appearance frequency has been studied. In particular, a technique for detecting a word that has not appeared previously and instantaneously appears several times as an event is being studied.

However, the existing study provides an event detection result in which keywords are simply listed. Therefore, a user may not readily refer a keyword to an event.

Also, a graph-based event detection method may clearly express a result in the case of using an ontology, however, may detect only an event included in the ontology. That is, an event not included in the ontology may not be detected.

An event detection method not depending on the ontology may not readily guarantee the accuracy of the result due to a user intervention in a clustering process.

Existing methods based on a word appearance frequency may not filter out a word frequently used with a malicious intent.

Accordingly, there is a need for a technique capable of improving the accuracy of event detection by applying a user interest in addition to a word appearance frequency.

SUMMARY

Example embodiments provide a method and system for detecting a graph-based event in a social network that may verify a user interest on social data based on a variation of a social action, such as share and reshare, and use the verified user interest for event detection, thereby enhancing the accuracy of an existing event detection method based on a word appearance frequency.

Example embodiments also provide a method and system for detecting a graph-based event in a social network that may generate a keyword graph by preprocessing data collected from a social network, may cluster at least one candidate graph semantically different from a center keyword based on a betweenness centrality of a word, and may select an event graph having a relatively high reliability from among a plurality of candidate graphs by applying, as a weight, a user interest according to a variation of a social action.

According to an aspect of at least one example embodiment, there is provided a method of detecting a graph-based event in a social network, the method including generating a keyword graph based on social data collected from a social network system; separating the keyword graph into a plurality of candidate graphs through clustering; calculating a user interest for each of the plurality of candidate graphs based on a per-time variation of a social action associated with the social data; and determining K candidate graphs among the plurality of candidate graphs as an event graph based on the user interest. Here, k denotes a natural number.

According to another aspect of at least one example embodiment, there is provided a system for detecting a graph-based event in a social network, the system including a generator configured to generate a keyword graph based on social data collected from a social network system; a clustering engine configured to separate the keyword graph into a plurality of candidate graphs through clustering; a calculator configured to calculate a user interest for each of the plurality of candidate graphs based on a per-time variation of a social action associated with the social data; and a determiner configured to determine K candidate graphs from among the plurality of candidate graphs as an event graph based on the user interest. Here, k denotes a natural number.

According to example embodiments, by verifying a user interest based on a simultaneous appearance frequency of a word and a variation of a social action representing sympathy for social data when detecting an event as a main topic by analyzing the social data based on a graph, and by applying the verified user interest as a weight of the graph, it is possible to enhance the reliability and accuracy of the detected event.

Also, according to example embodiments, it is possible to overcome a difficulty in providing a desired result due to intervention of a user by automatically and repeatedly clustering a keyword graph using a betweenness centrality of a vertex and a line.

Also, according to example embodiments, it is possible to enhance the reliability and accuracy of an event detection result by filtering out advertising postings or words frequently used with malicious intent.

Also, according to example embodiments, it is possible to effectively transmit an event detection result of an event detection method based on a keyword graph using a graph that represents a relationship between words instead of using a word unit.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 3 illustrates an example of a process of preprocessing social data in an event detection system according to an example embodiment;

FIG. 5 illustrates an example of a clustering algorithm in an event detection system according to an example embodiment;

DETAILED DESCRIPTION

Figure 1:
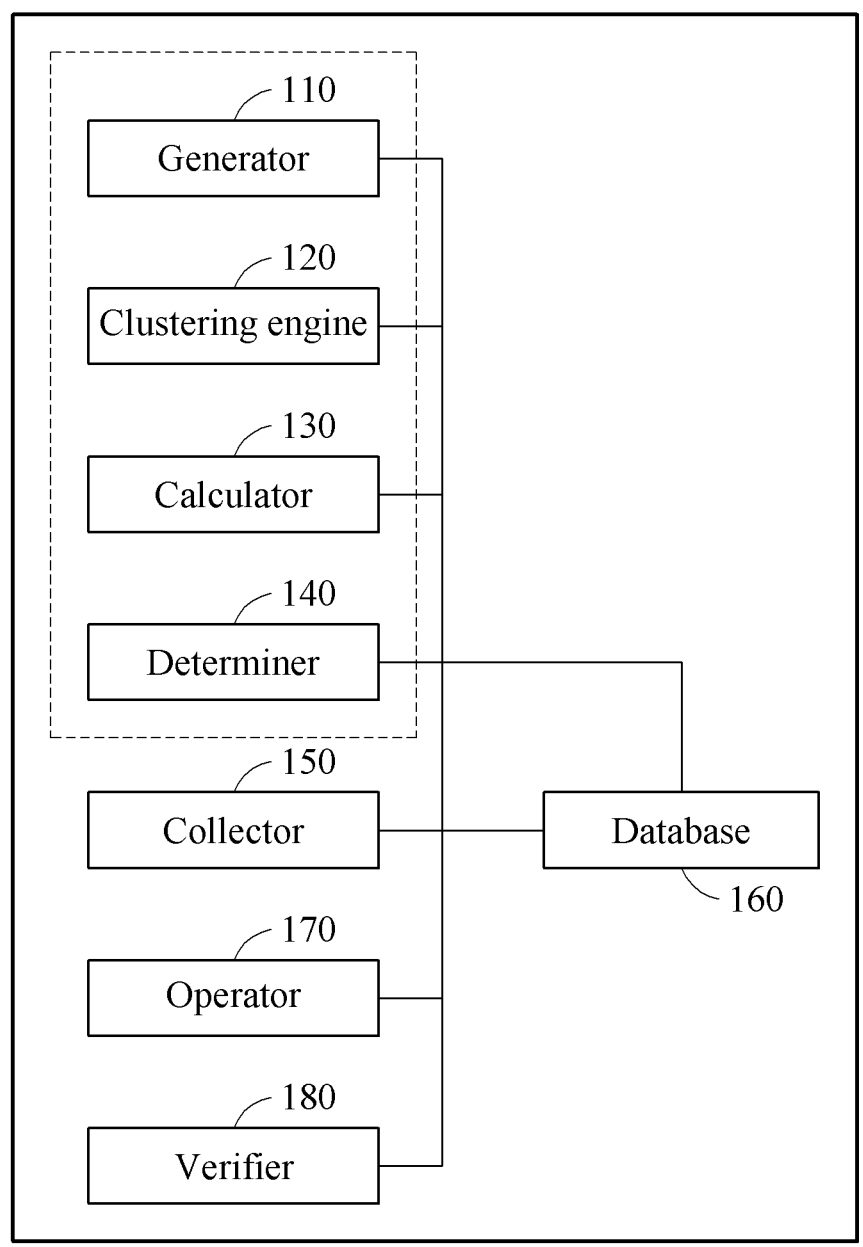
FIG. 1 is a diagram illustrating a system (hereinafter, an event detection system) for detecting a graph-based event in a social network according to an example embodiment.

Hereinafter, some example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Also, regarding the reference numerals assigned to the elements in the drawings, it should be noted that the same elements will be designated by the same reference numerals, wherever possible, even though they are shown in different drawings. In the detailed description of well-known related structures or functions will be omitted when it is deemed that such description will cause ambiguous interpretation of the present disclosure.

FIG. 1 is a diagram illustrating a system (hereinafter, an event detection system) for detecting a graph-based event in a social network according to an example embodiment.

Referring to FIG. 1, an event detection system 100 may include a generator 110, a clustering engine 120, a calculator 130, and a determiner 140. Depending on example embodiments, the event detection system 100 may further include a collector 150, a database 160, an operator 170, and a verifier 180.

The generator 110 generates a keyword graph (initial graph) based on social data collected from a social network system.

In general, relevant expressions or additional circumstances are described together in social data that includes an event as a main topic and a circumstance. Therefore, the generator 110 may generate the keyword graph using words that simultaneously appear in the social data.

For example, the generator 110 may generate the keyword graph by setting a word (keyword) extracted from the social data through a preprocessing process and by connecting between vertices corresponding to two words that simultaneous appear in the social data using a line.

According to an example embodiment, it is possible to enhance the efficiency by preventing a duplicate detection from occurring when performing a graph-based event detection.

Depending on example embodiments, the event detection system 100 may further include the collector 150 and the database 160.

The collector 150 may collect social data, for example, a posting, and a social action associated with the social data from the social network system at desired intervals and may store the collected social data and the social action in the database 160.

Also, an event graph detected by the determiner 140 may be stored in the database 160 in association with the social data and the social action.

Here, the term "social action" may refer to an action of a user that reads social data on the social network system, such as share, for example, "like" and reshare, for example, "retweet".

The collector 150 may further collect a number of social actions associated with the social data during a first time and the calculator 130 may calculate a variation in the number of social actions (also, referred to as a social action variation or a variation of a social action).

The generator 110 may generate the keyword graph by preprocessing the social data, by removing, from the social data, a word that belongs to a special character, a uniform resource locator (URL), a postposition, a newly-coined word, an adverb, or a word that does not satisfy a predetermined appearance frequency, by matching at least one of a noun and a verb root extracted by the processing to a vertex, and by connecting the vertices using a line based on whether words matching the vertices simultaneously appear.

Figure 4:
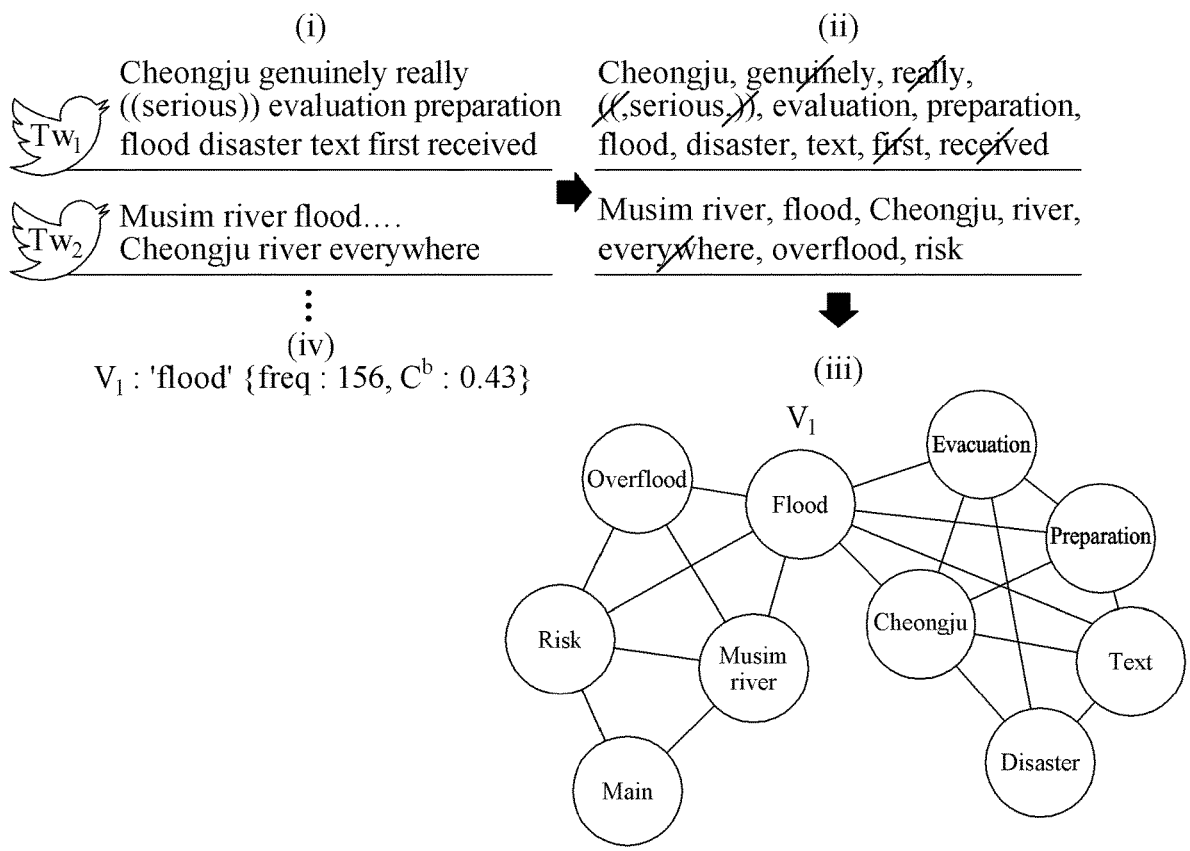
FIG. 4 illustrates an example of a process of generating a keyword graph in an event detection system according to an example embodiment.

For example, referring to FIG. 4, the generator 110 may generate a keyword graph (initial graph) by removing, from social data, a special character used for a hashtag function or a resharing function and a special character used to express a nuance of a sentence, such as emoticon, an exclamation point, a period, a question mark, etc., and then removing, from the social data, a URL and a stop word such as a "preposition", a "newly-coined word", and an "adverb" representing a grammatical relationship between words, and by extracting at least one word (keyword) from among a noun and a verb root that include a main meaning in event detection through a morphological analyzer.

Here, the generator 110 may regard a word used less than a predetermined number of times in the social data as being unassociated with an event and accidently used and may remove the word from the social data prior to generating the keyword graph.

The clustering engine 120 may separate the keyword graph into a plurality of candidate graphs through clustering.

That is, the clustering engine 120 may perform clustering based on a betweenness centrality of a line and a vertex constituting the keyword graph and may separate the keyword graph into a semantically different plurality of candidate graphs.

Here, the betweenness centrality may refer to an attribute that a specific vertex or a specific line is necessarily included among all of the shortest paths available in the keyword graph.

Depending on example embodiments, the event detection system 100 may further include the operator 170.

The operator 170 may calculate all the shortest paths available between two vertices among vertices of the keyword graph, and may calculate a ratio of shortest paths passing through a specific vertex among all the shortest paths as a first betweenness central attribute value of the specific vertex.

That is, the operator 170 may calculate a first betweenness central attribute value ($C^b_{vertex}$) for a ratio of shortest paths passing through a corresponding vertex with respect to each vertex of the keyword graph and may use the calculated first betweenness central attribute value to select a center keyword.

The clustering engine 120 may select a word that matches a vertex having a highest first center attribute value in the keyword graph as a center keyword. Through this, the clustering engine 120 may readily derive a consistent and automated clustering result.

Also, the operator 170 may calculate a ratio of shortest paths passing through a specific line among all the shortest paths as a second betweenness central attribute value of the specific line.

That is, the operator 170 may calculate a second betweenness central attribute value ($C^b_{edge}$) for a ratio of shortest paths passing through a corresponding line with respect to each line of the keyword graph and may use the calculated second betweenness central attribute value for clustering based on the center keyword.

The clustering engine 120 may separate the keyword graph into a first candidate graph including a vertex that matches the center keyword and a vertex that is connected thereto using a line and a second candidate graph excluding the first candidate graph.

For example, the clustering engine 120 may remove, from the keyword graph, a line having the calculated second betweenness central attribute value greater than a threshold in descending order of the second betweenness central attribute value and may return the keyword graph from which the line is removed as one of the plurality of candidate graphs.

Depending on example embodiments, the clustering engine 120 may separate the second candidate graph into one or more candidate graphs by iteratively performing a center keyword selection process and a separation process.

For example, referring to FIGS. 6A to 6E, the clustering engine 120 may determine a vertex 'Cheongju' having a highest $C^b_{vertex}$ as a center keyword in a keyword graph 610 and may set vertices 'Cheonan', 'lowland', 'risk factor' and 'Shingye-ri' that are separate from the center keyword by two hops or more as removal targets 601.

The clustering engine 120 may sequentially cut lines 602 and 605 deviated from a reliable section of 95% when normalizing $C^b_{edge}$ of each line in the keyword graph 610 and may duplicate two vertices disconnected by cutting and may connect each of vertices 603, 604, 606, and 607 using a line.

Since the vertex 'Cheongju' selected as the center keyword and vertices set as the removal targets 601 are present in different clusters 620 and 630, the two clusters 620 and 630 may be returned as candidate graphs.

As described above, the clustering engine 120 may automatically and iteratively perform clustering on the keyword graph 610 using a betweenness centrality of a line and a vertex.

The determiner 140 may determine k candidate graphs among the plurality of candidate graphs as an event graph based on the user interest. Here, k denotes a natural number.

Here, k may be input in advance as a number of event graphs requested by a user (manager).

Compared to an existing method of providing an event detection result as a list of keywords so that the user may derive an event, the determiner 140 may provide the event detection result using the event graph that represents a relationship between words. Accordingly, the accuracy of the result may be enhanced.

Also, the determiner 140 may determine the event graph based on the user interference for each of the plurality of candidate graphs and may preferentially detect an event from social data in which a plurality of users is interested.

Also, when determining the event graph, the determiner 140 may further consider the user interest in addition to a simultaneous appearance. Accordingly, advertising postings or words frequently used with malicious intent may be filtered out, which may lead to enhancing the reliability of the event detection result.

Hereinafter, a process of determining an event graph from a plurality of candidate graphs in which a user interest is applied as a weight of a line will be further described.

The calculator 130 calculates the user interest for each of the plurality of candidate graphs based on a per-time variation of a social action associated with the social data.

For example, the collector 150 may collect, from the social network system, a number of social actions representing sympathy associated with social data in which words matching two vertices in the candidate graph simultaneously appear during a first time. The calculator 130 may calculate a variation in the number of social actions during the first time based on a number of social actions during a second time that is a previous time of the first time, and may calculate the user interest for each of the words matching the two vertices based on the calculated variation.

For example, the calculator 130 may calculate the variation in the number of social actions by dividing the number of social actions during the first time by the number of social actions collected during the second time that is the previous time of the first time and the same time interval as the first time.

Here, the first time refers to a time corresponding to a single window sliding. Depending on example embodiments, the first time may be set to partially overlap the second time. In this case, a word increase amount may be verified.

As another example, the calculator 130 may count a frequency the words matching the two vertices simultaneously appear and may calculate the user interest by further using the frequency.

That is, the calculator 130 may calculate the user interest by using a social action for a posting in which two words simultaneously appear and a frequency the two words simultaneously appear according the following Equation 5.

The calculator 130 may assign the calculated user interest as a weight of a line that connects two words (vertices) and may iteratively perform the aforementioned process for every two words connected using a line in the candidate graph.

In detail, the calculator 130 may assign, as a weight, a user interest for each of words matching two vertices to a line that connects the words in the candidate graph, and may calculate an event detection coefficient for each candidate graph by adding up weights assigned to all the lines of the candidate graph.

Here, the event detection coefficient may be used as a standard to determine whether a corresponding candidate graph is valuable as an event graph, with respect to each of the plurality of candidate graphs.

That is, the calculator 130 may calculate the user interest based on the variation of the social action and the simultaneous appearance frequency and may apply the calculated user interest as a weight to each candidate graph. The determiner 140 may sort the plurality of candidate graph in descending order of the event detection coefficient that is a sum of weights, and may select k top candidate graphs requested by the user from among the sorted candidate graphs as the event graphs.

That is, the higher the event detection coefficient, the determiner 140 may determine that a corresponding candidate graph attracts a relatively large number of users and is frequently used, and may determine the candidate graph as the event graph.

Depending on example embodiments, the event detection system 100 may further include the verifier 180 configured to verify each of the plurality of candidate graphs and to enhance the accuracy of event graph detection.

The verifier 180 may verify each of the plurality of candidate graphs by verifying whether a corresponding vertex and a neighboring vertex thereof simultaneously appear in the social data with respect to each of vertices of a candidate graph.

For example, the verifier 180 may verify the candidate graph by selecting a word that matches a vertex having a highest first betweenness central attribute value from the candidate graph as a center keyword, by verifying whether vertices within a desired number of hops from the center keyword simultaneously appear in the social data, while increasing the number of hops, and by maintaining simultaneously appearing vertices in the candidate graph and removing non-simultaneously appearing vertices from the candidate graph based on the verification result.

Figure 7A:
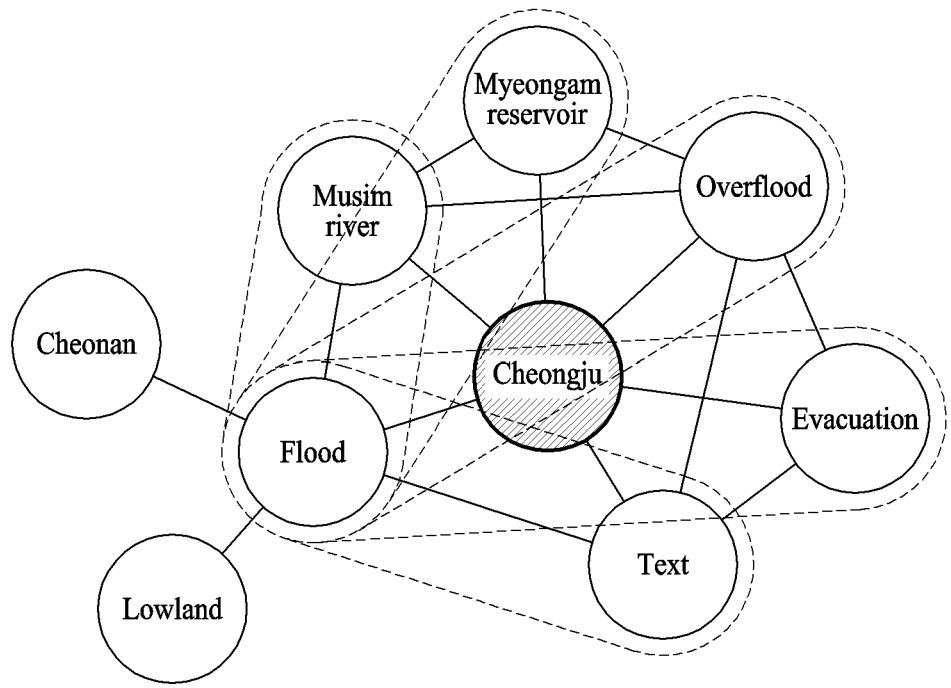
FIGS. 7A to 7C illustrate examples of a process of verifying a plurality of candidate graphs in an event detection system according to an example embodiment.

For example, referring to FIG. 7A, the verifier 180 may determine a vertex 'Cheongju' having a highest $C^b_{vertex}$ as a center keyword, may group, as a pair, every two of vertices 'flood', 'Musim river', 'Myeongam reservoir', 'overflood', 'evacuation' and 'text' within a single hop from the center keyword, and may verify whether a pair of vertices simultaneously appear in the social data.

Figure 7B:
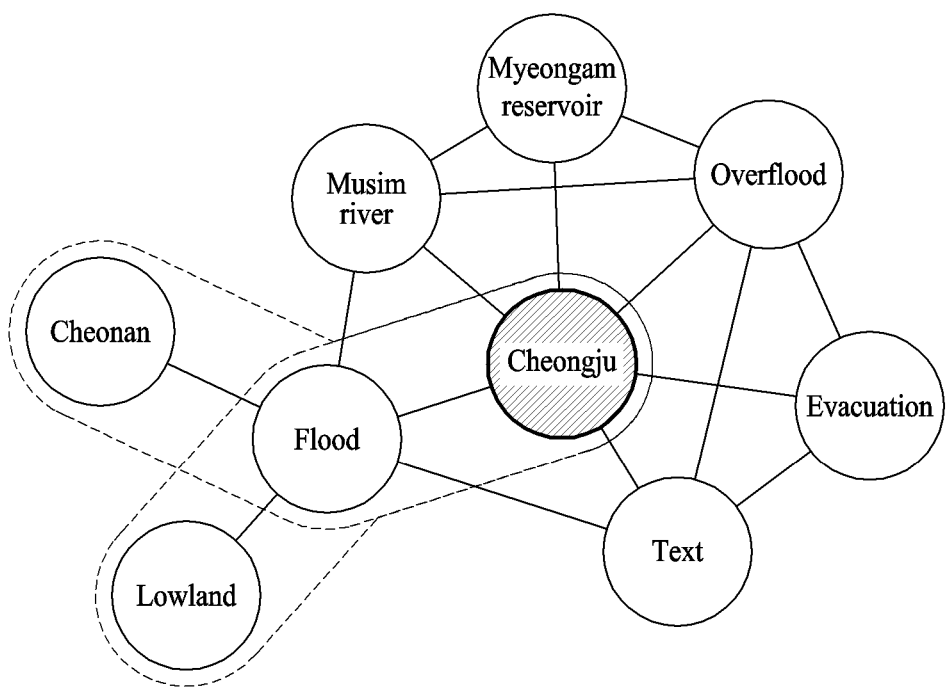

Referring to FIG. 7B, the verifier 180 may verify a simultaneous appearance with respect to vertices within two hops from the center keyword by increasing the number of hops and may remove, from the candidate graph, a vertex 'Cheonan' and a vertex 'lowland' that are not connected to the center keyword, that is, the vertex 'Cheongju' using a line.

As described above with FIGS. 6A to 6E, the verifier 180 may remove, from each candidate graph, the duplicated vertices 'Cheonan' and 'lowland' in response to cutting the line during the clustering process. In this manner, the event graph may be accurately detected.

The determiner 140 may select a candidate graph to be determined as the event graph from among the verified candidate graphs. Accordingly, the accuracy of the detected event graph may be enhanced.

According to an example embodiment, since social data is analyzed based on a graph, it is possible to verify a user interest based on a simultaneous appearance frequency of words and a variation of a social action representing sympathy for the social data when detecting an event as a main topic, and to apply the verified user interest as a weight. Accordingly, it is possible to enhance the reliability and accuracy of the detected event.

Figure 2:
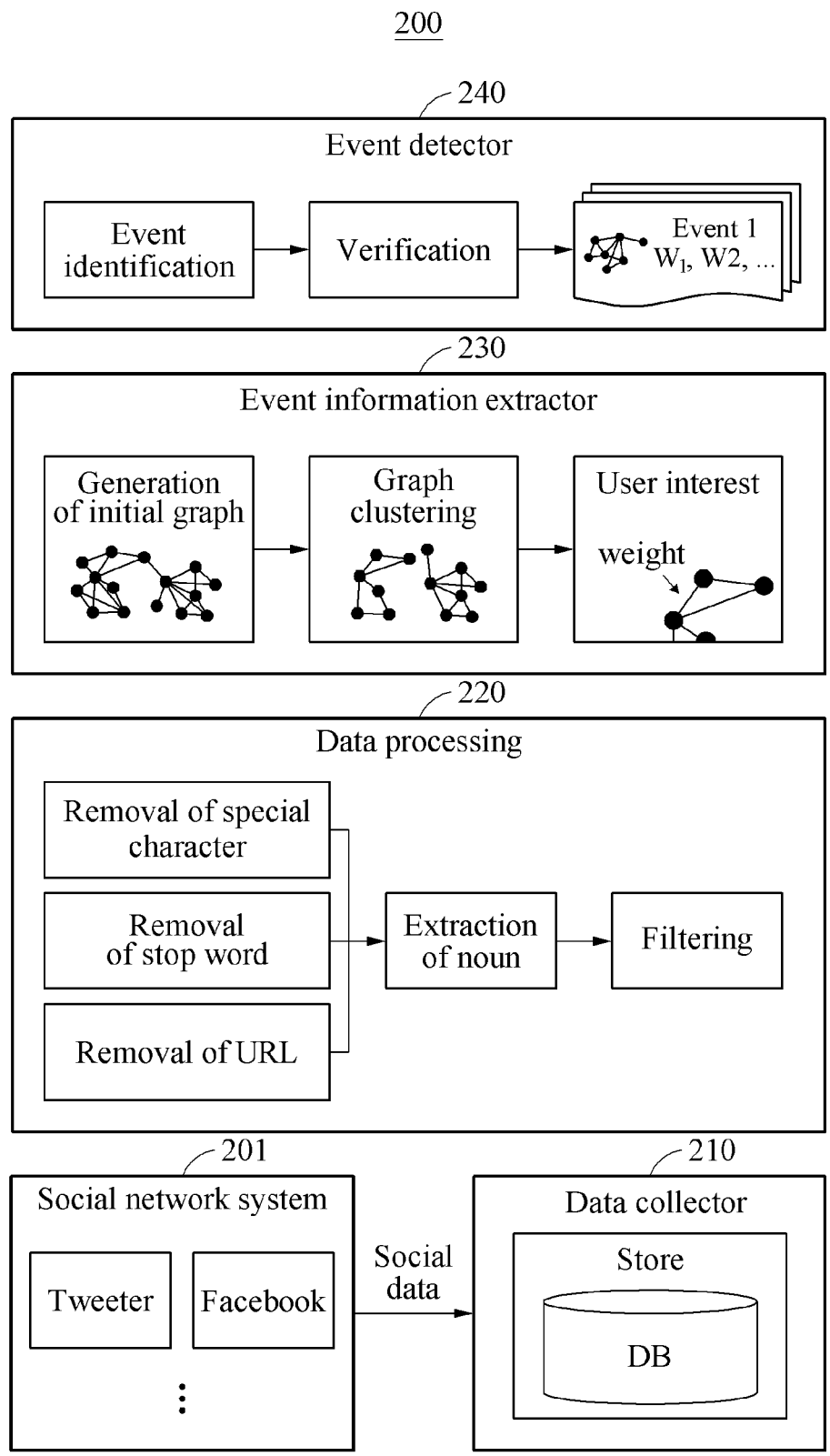
FIG. 2 is a diagram illustrating a structure of an event detection system according to an example embodiment.

FIG. 2 is a diagram illustrating a structure of an event detection system according to an example embodiment.

Referring to FIG. 2, an event detection system 200 may include a data collector 210, a data preprocessing 220, an event information extractor 230, and an event detector 240.

The data collector 210 performs a process of collecting social data required for event detection from a social network system 201 and storing the collected social data in a database (DB).

The data collector 210 may periodically collect the social data, for example, postings, profiles, photos, moving pictures, etc., uploaded by users in association with various social network systems 201, for example, Twitter, Facebook, Instagram, KakaoTalk, LINE, etc.

When collecting the social data, the data collector 210 may further collect a social action associated with the social data.

For example, the data collector 210 may collect a number of positive social actions representing sympathy such as "like!" and representing reshare such as "retweet" at desired time intervals.

The data preprocessing 220 performs a process of preprocessing the collected social data to generate a keyword graph (initial graph).

The data preprocessing 220 may remove at least one of a special character, a URL, and a stop word from the collected social data. For example, the data preprocessing 220 may regard, as stop words, a "preposition" representing a grammatical relationship with another word by adding to a substantive, a newly-coined word such as 'kkk', and an adverb such as 'just' and 'great', and may remove such stop words from the collected social data.

The data preprocessing 220 may extract at least one of a noun and a verb root that include a main meaning in event detection through a morphological analyzer.

The data preprocessing 220 may regard a word used less than a predetermined number of times in the social data as being unassociated with an event and accidently used and may remove the word from the social data prior to generating the keyword graph.

The event information extractor 230 performs a process of generating the keyword graph (initial graph) using the word extracted through the preprocessing process and by separating the keyword graph into a plurality of candidate graphs through clustering.

The event information extractor 230 may generate the keyword graph by setting the word (keyword) extracted through the preprocessing process as a vertex and by connecting between vertices corresponding to two words that simultaneously appear in the social data using a line.

In general, relevant expressions or additional circumstances are described together in social data that includes an event as a main topic and a circumstance. Therefore, the event information extractor 230 may generate the keyword graph using words that simultaneous appear in the social data, thereby preventing a duplicate event detection and effectively performing a graph-based event detection.

The event information extractor 230 may separate the keyword graph into a semantically different plurality of candidate graphs by performing clustering based on a betweenness centrality of a line and a vertex of the keyword graph.

That is, the event information extractor 230 may perform clustering of determining the center keyword that represents an event based on a betweenness centrality of a vertex and finding a semantically different candidate event graph based on a betweenness centrality of a line.

Here, the betweenness centrality may refer to an attribute that a specific vertex or a specific line is necessarily included among all the shortest paths available in the keyword graph.

Accordingly, a betweenness centrality (first betweenness central attribute value) of a vertex being high may indicate that a ratio of shortest paths passing through the corresponding vertex among all the shortest paths is high, and may indicate that a use ratio of a corresponding word with other words is relatively high and is highly likely to be a center keyword in social data.

The event information extractor 230 may determine a vertex (word) having a highest betweenness centrality as a center keyword representing a high event probability and may perform clustering using the center keyword and a word that simultaneously appears with the center keyword, that is, a vertex that is connected to the center keyword using a line. Through this, it possible to outperform limitations found in an existing method that may not readily derive a consistent and automated clustering result due to user intervention.

Also, a betweenness centrality (second betweenness central attribute value) of a line being high may indicate that a ratio of shortest paths passing through the corresponding line is high, and may indicate that the line is highly likely to connect two candidate graphs representing semantically different events, respectively.

Using this, the event information extractor 230 may sequentially cut lines having a betweenness centrality greater than a threshold during the clustering process and may separate the keyword graph into one or more candidate graphs semantically different based on the center keyword.

The event information extractor 230 may calculate the user interest based on a per-time variation of a social action representing sympathy such as "like" and reshare such as "retweet" and a frequency two words simultaneously appear in the social data, and may assign the calculated user interest as a weight to a line that connects two words (vertices) in the plurality of candidate graphs.

Hereinafter, a process of generating an initial graph, clustering the initial graph into a candidate graph, and applying a user interest is further described.

The event information extractor 230 may generate the initial graph by generating each vertex using a keyword (word) having gone through the preprocessing process and by connecting vertices of two words that simultaneously appear in social data using a line. That is, the event information extractor 230 may connect two vertices (keywords) simultaneously used once or more in the social data using a line.

In detail, the event information extractor 230 may generate a keyword graph $G_t$ based on a set V of vertices, a set E of lines that connect vertices, and a set W of weights each assigned to a line between vertices.

The event information extractor 230 may calculate an appearance frequency of a vertex, that is, a number of times a word is used in social data and a first betweenness central attribute value with respect to each of vertices of the initial graph.

In detail, the event information extractor 230 may calculate an appearance frequency (freq) and a first betweenness central attribute value ($C^b_{vertex}$) for each vertex V1 representing a keyword (word) in the keyword graph $G_t$, and may perform clustering of the initial graph using the calculated appearance frequency (freq) and first betweenness central attribute value ($C^b_{vertex}$).

For example, the event information extractor 230 may calculate the first betweenness central attribute value ($C^b_{vertex}$) of each vertex according to Equation 1.

$$C^b_{vertex} = \sum_{s,t \in V} \frac{\sigma(s, t | v)}{\sigma(s, t)} \quad \text{[Equation 1]}$$

In Equation 1, $\sigma(s, t)$ denotes a total number of shortest paths between vertices s and t, and $\sigma(s, t|v)$ denotes a number of shortest paths that pass through the vertex v among all the shortest paths.

That is, the first betweenness central attribute value denotes a ratio of shortest paths that include a corresponding vertex among all the shortest paths available in the keyword graph.

That is, the betweenness centrality being high may indicate that a ratio of a corresponding keyword mentioned with other keywords is high and may also indicate that the corresponding keyword is highly likely to be a center keyword among keywords associated with an event.

Accordingly, the event information extractor 230 may determine the center keyword based on a betweenness centrality (first betweenness central attribute value) of a vertex and may perform clustering based on the center keyword.

The event information extractor 230 may use a betweenness centrality of a vertex and a line when performing clustering to determine a candidate event graph in the initially generated keyword graph. Accordingly, it is possible to prevent a form of a candidate graph from varying in response to a user request, which may occur in an existing method of performing clustering by receiving a number of events from the user. Also, it is possible to derive a consistent clustering result by minimizing user intervention.

With respect to each line E in the keyword graph $G_t$, the event information extractor 230 may calculate the user interest based on a simultaneous appearance frequency of two vertices (keywords) connected using a corresponding line in social data and a social action variation associated with the social data, and may assign the calculated user interest as a weight $W_i$.

In general, a social action may be a method of propagating information to many users and expressing a matter of interest of a user. Accordingly, the event information extractor 230 may apply the user interest for the event detection based on the social action variation, and may exclude erroneously posted spams or malicious postings from an event detection result, thereby enhancing the reliability of event detection.

The event information extractor 230 may calculate the user interest based on the social action variation and the simultaneous appearance frequency according to Equation 2, and may assign the user interest as a weight to a line that connects two keywords (vertices).

Here, although a method of representing an opinion or interest of a user on social data may be different for each social network system 201, the social action may be an action of representing sympathy ("like!") or reshare ("retweet") in the social data. That is, the event information extractor 230 may calculate the user interest based on, for example, a variation in a number of shares or a number of reshares for a corresponding posting.

$$S_{i,j} = \frac{(N^t_{RT} + N^t_{Like})}{(N^{t-1}_{RT} + N^{t-1}_{Like})} \quad \text{[Equation 2]}$$

In Equation 2, $N^t_{RT}$ denotes a number of reshares ("retweets") for a posting in which words i and j simultaneously appear during a time t (first time), and $N^t_{Like}$ denotes a number of shares ("like") for the posting in which the words i and j simultaneously appear during the time t (first time).

Also, $N^{t-1}_{RT}$ denotes a number of reshares ("retweets") for the posting in which the words i and j simultaneously appear during a time (t−1) (second time) that is a previous time of the time t, and $N^{t-1}_{Like}$ denotes a number of shares ("likes") for the posting in which the words i and j simultaneously appear during the time (t−1) (second time) that is the previous time of the time t.

The event information extractor 230 may normalize the social action variation calculated according to Equation 2, and may adjust a weight to be assigned based on the social action variation according to Equation 3. In Equation 3, each of μ and β denotes a constant for adjusting a weight range, and $S_{i,j}$ denotes a value calculated in Equation 2.

$$NS_{i,j} = \mu \cdot (\beta^{S_{i,j}} - 1) \quad \text{[Equation 3]}$$

The event information extractor 230 may apply a weight based on a frequency two words simultaneously appear according to Equation 4. In equation 4, $\text{frequency}_{i,j}$ denotes the frequency the two words i and j simultaneously appear.

$$F_{i,j} = \log(\text{frequency}_{i,j}) \quad \text{[Equation 4]}$$

The event information extractor 230 may assign a weight to each of lines connecting the respective two words (vertices) in a candidate graph based on the user interest for the posting in which the two words i and j simultaneously appear and the frequency the two words i and j simultaneously appear.

$$W_{i,j} = \alpha \cdot NS_{i,j} + (1-\alpha) \cdot F_{i,j} \quad \text{[Equation 5]}$$

In Equation 5, α denotes a constant adjusted based on the user interest and an appearance frequency distribution, $NS_{i,j}$ denotes a weight according to the social action variation calculated according to Equation 3, and $F_{i,j}$ denotes a weight according to the simultaneous appearance frequency calculated according to Equation 4.

The event information extractor 230 may assign a weight to each of lines of a candidate event graph using Equation 5, and the assigned weight may be used by the event detector 240 to detect an event.

Here, each of n candidate graphs may include an event. However, a candidate graph corresponding to a relatively high user interest and a relatively high simultaneous appearance frequency is to be preferentially detected as an event graph. Accordingly, a value as an event needs to be identified with respect to each of the plurality of candidate graphs. Here, the weight calculated according to Equation 5 may be used.

That is, a weight assigned to each line $E_i$ of a candidate graph may be used as a standard for selecting a candidate graph valuable as the event graph.

The event detector 240 performs a process of identifying the event graph from among the plurality of candidate graphs based on the weight assigned to each line, and verifying the identified event graph.

To determine the value as the event, the event detector 240 may calculate an event detection coefficient for each of a plurality of candidate event graphs and may identify, as event graphs, k top candidate graphs requested by the user in descending order of the event detection coefficient.

For example, the event detector 240 may calculate the event detection coefficient $D_t$ for each candidate graph according to Equation 6, and may derive a number of event graphs requested by the user as a result.

$$D_t = \log \sum_{i,j \in V} W_{i,j} \quad \text{[Equation 6]}$$

In Equation 6, each of i and j denote a vertex belonging to a candidate graph, $W_{i,j}$ denotes a weight of a line that connects the vertices i and j, and $D_t$, as a sum of weights assigned to the respective lines of the candidate graph based on the user interest and the simultaneous appearance frequency, represents the user interest for each of words belonging to the candidate graph as an equation.

As the event detection coefficient of the candidate graph increases, many social actions attract interest of many users, the simultaneous appearance frequency increases, and a mention amount also increases in social data. Therefore, the event detector 240 may determine that the candidate graph has a value as an event.

As described above, dissimilar to an existing method using only an appearance frequency of a word, the event detector 240 may detect the event graph by further using the user interest. Therefore, the reliability of result may be enhanced.

Meanwhile, a word unnecessarily added during a clustering process or deviated from a topic may be included among vertices of an event graph. Therefore, the event detector 240 may perform verification prior to detecting the event graph and the accuracy of an event detection result may be enhanced.

For example, the event detector 240 may determine a center keyword having a highest first betweenness central attribute value ($C^b_{vertex}$) among vertices included in a candidate graph, may group, as a pair, every two vertices connected within a single hop from the center keyword, and may verify whether keywords corresponding to a pair of vertices simultaneously appear in a single positing (social data)

The event detector 240 may maintain vertices that are verified to simultaneously appear in the candidate graph, may regard vertices that are verified to non-simultaneously appear as vertices deviated from a topic of the candidate graph or added or duplicated during the clustering process, and may remove the vertices from the candidate graph.

Also, with respect to vertices separate from the center keyword by two hops or more, the event detector 240 may verify whether a corresponding vertex simultaneously appears with another vertex present in a shortest path from the vertex to the center keyword.

Even in this case, the event detector 240 may verify whether a word that matches a single vertex simultaneously appears with other vertices, and when the word does not simultaneously appear with other words at a probability of a threshold (for example, 30%) or more, may remove the corresponding vertex from the candidate graph.

As described above, the event detector 240 may derive a highly reliable event graph by performing verification with respect to the plurality of candidate graphs.

According to an example embodiment, by verifying a user interest for social data based on a variation of a social action, such as sympathy and reshare, and a simultaneous appearance frequency and by further considering the user interest for event detection, it is possible to easily filter out an advertising posting or a maliciously used word. Through this, it is possible to enhance the reliability of an event detection result. Further, it is possible to enhance the accuracy of an event detection result by providing the event detection result in a form of a graph that represents a relationship between words through automated clustering without user intervention.

FIG. 3 illustrates an example of a process of preprocessing social data in an event detection system according to an example embodiment.

Referring to FIG. 3, social data collected by the event detection system from a social network system may include a special character for a hashtag function or a resharing function in addition to information on an event as a main word.

Taking "tweeter" as an example in the social network system, social data may include a plurality of special characters (for example, @ and #) used for a mention function used to have a conversation by mentioning a specific user, a retweet function used to share an opinion of another user or add an opinion, and a hashtag function used for indexing so that various persons may easily converse over a specific topic.

In addition, the social data may include a plurality of special characters used to express emoticon, an exclamation point, a period, a question mark, etc., and a plurality of unnecessary words, such as a URL.

Also, the social data may include insignificant stop words including a "preposition" that represents a grammatical relationship with another word by adding to a substantive such as a noun, a "newly-coined word" such as "kkk", and an adverb such as "just".

Accordingly, the event detection system may perform a preprocessing process of removing a special character, a URL, and an unnecessary word for event detection, such as a stop word, from the social data, extracting a word corresponding to a noun or a verb root, and filtering out a word that does not satisfy a predetermined appearance frequency among the extracted words, and may refine only event related information.

(i) of FIG. 3 is an example of social data (posting) collected from the social network system.

Referring to (ii) of FIG. 3, the event detection system may remove a special character '#' for using an SNS function, a special character '[', and URL 'http://omn.kr/oluj' from the social data.

After performing a special character removal process, the event detection system may extract a word (keyword) required for analysis by performing a natural word processing process with respect to each sentence.

Referring to (iii) of FIG. 3, the event detection system may extract words including nouns such as "Pohang" and "earthquake" and verb roots such as "collapsed" and "destroyed" using a noun extraction function of a morphological analyzer in a state in which prepositions and insignificant stop words are removed.

Depending on example embodiments, the event detection system may determine that a word not satisfying a predetermined appearance frequency (for example, twice) is highly likely to be an accidently used word and may additionally remove a word having a low frequency. In this manner, the event detection system may filter out a word unsuitable for event detection and may increase a processing rate of generating a keyword graph.

As described above, the event detection system may prevent insignificant words from being detected as an event by performing the preprocessing process on the social data.

FIG. 4 illustrates an example of a process of generating a keyword graph in an event detection system according to an example embodiment.

Referring to FIG. 4, the event detection system may remove special characters and stop words such as adverbs from social data (i) and may perform preprocessing (ii).

The event detection system may generate words, 'flood', 'Cheongju', 'evacuation', 'overflood', 'disaster', etc., extracted from (ii) of FIG. 4 to which the preprocessing process is performed as vertices and may connect two vertices that simultaneously appear in a single sentence using a line.

For example, instead of providing a simple list of words, the event detection system may represent a relationship between words in a form of a graph by connecting words 'Cheongju' and 'preparation' that simultaneously appear in a single posting ('$Tw_1$') using a line, and by not connecting the word ('preparation') used in a single posting ('$Tw_1$') and a word 'overflood' used in another posting ('$Tw_2$').

Referring to iv of FIG. 4, the event detection system may calculate an appearance frequency ('freq') and a betweenness central attribute value ('$C^b$') for each vertex $V_i$ within the keyword graph and may use the keyword graph for clustering.

For example, when a word 'flood' appears 156 times in the keyword graph and a ratio of shortest paths passing through the word 'flood' among all the shortest paths available in the keyword graph is '0.43', the event detection system may calculate an attribute value of the word 'flood' as '{freq:156:Cb:0.43}' and may repeat the same with respect to all the vertices in the keyword graph.

FIG. 5 illustrates an example of a clustering algorithm in an event detection system according to an example embodiment.

Referring to FIG. 5, the event detection system may calculate a first betweenness central attribute value ($C^b_{vertex}$) with respect to all of vertices in an initial graph (keyword graph) and may determine a word of a vertex having a highest first betweenness central attribute value ($C^b_{vertex}$) as a center keyword.

Vertices separate from the center keyword by two hops or more do not simultaneously appear in a single posting or a single sentence. That is, since the vertices are highly likely to be irrelevant keywords, the event detection system may set the vertices as removal targets.

The event detection system may calculate a second betweenness central attribute value ($C^b_{edge}$) with respect to all of lines in the keyword graph and may verify different clusters (candidate graphs). A line that connects two clusters is included as a path that needs to go through when configuring a shortest path and thus is likely to have a relatively high value.

When $C^b_{edge}$ of all the lines is assumed to follow a normalization distribution, the event detection system may perform clustering based on a case in which there is a line having $C^b_{edge}$ greater than a threshold of '(m+2σ) value' and a case in which there is no line having $C^b_{edge}$ greater than the threshold.

In the first case, the event detection system may iteratively perform a process of cutting a line having the highest $C^b_{edge}$, generating a new line with respect to each of two vertices connected using the cut line, and duplicating each of the vertices disconnected due to the cut line.

If there is no more line outside the threshold through the iterative process, the event detection system may remove a vertex present in the same cluster as that of the center keyword from among the vertices set as the removal targets.

Through this, if all the vertices set as the removal targets and the center keyword are present in different clusters, the event detection system may release the corresponding vertices from the removal targets.

Accordingly, the event detection system may return the cluster to which the center keyword and each of the clusters to which the released vertices as candidate graphs.

FIGS. 6A to 6E illustrate examples of a process of clustering a keyword graph into a plurality of candidate graphs in an event detection system according to an example embodiment.

Referring to FIGS. 6A through 6E, the event detection system may separate the keyword graph (initial graph) 610 into the plurality of clusters 620 and 630 based on the clustering algorithm of FIG. 5.

Figure 6A:
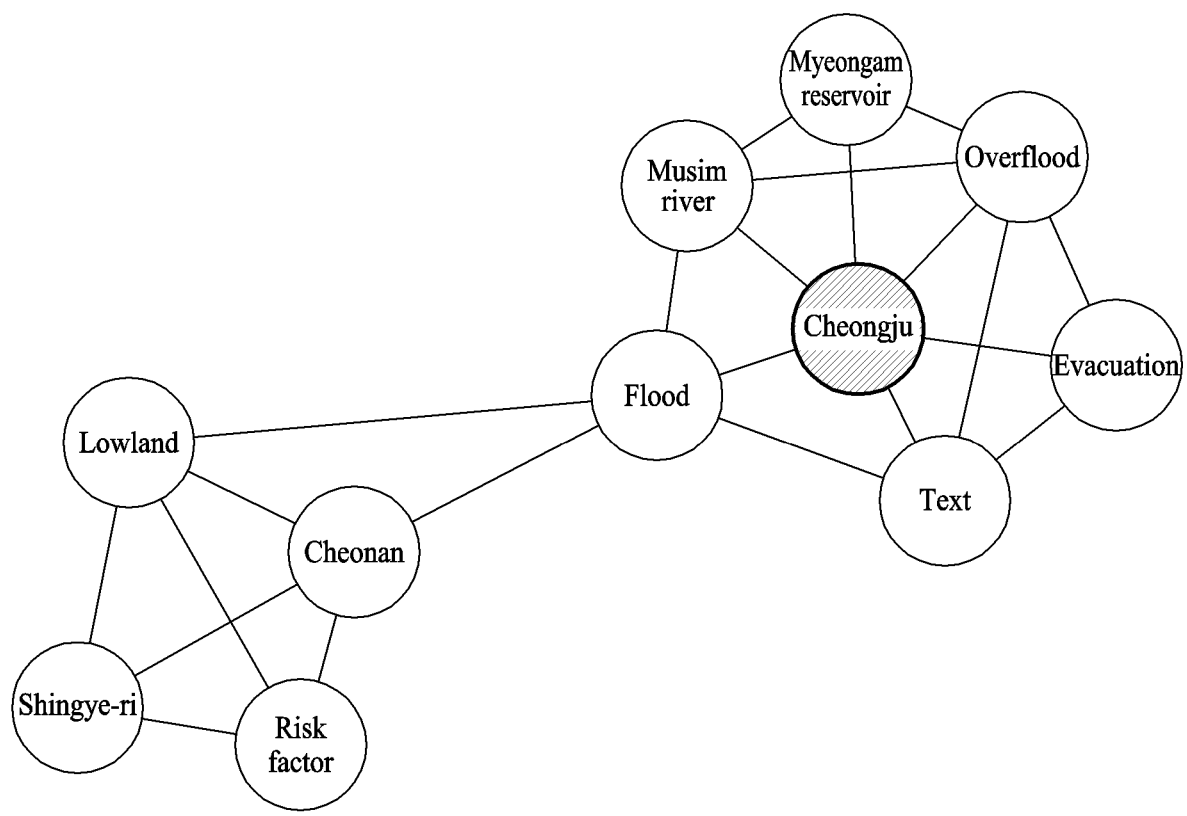
FIGS. 6A to 6E illustrate examples of a process of clustering a keyword graph into a plurality of candidate graphs in an event detection system according to an example embodiment.

FIG. 6A illustrates the keyword graph 610 generated by determining words extracted by preprocessing social data as vertices and by connecting every two words that simultaneously appear in the social data using a line.

The event detection system may calculate the first betweenness central attribute value ($C^b_{vertex}$) with respect to a ratio of shortest paths passing through a corresponding vertex with respect to each of the vertices in the keyword graph 610 and may use the calculated first betweenness central attribute value to select a center keyword.

Also, the event detection system may calculate the second betweenness central attribute value ($C^b_{edge}$) with respect to a ratio of shortest paths passing through a corresponding line with respect to each of the lines in the keyword graph 610 and may use the calculated second betweenness central attribute value ($C^b_{edge}$) to perform clustering based on the center keyword.

The event detection system may determine the vertex 'Cheongju' having the highest $C^b_{vertex}$ in the keyword graph 610 as the center keyword.

Figure 6B:
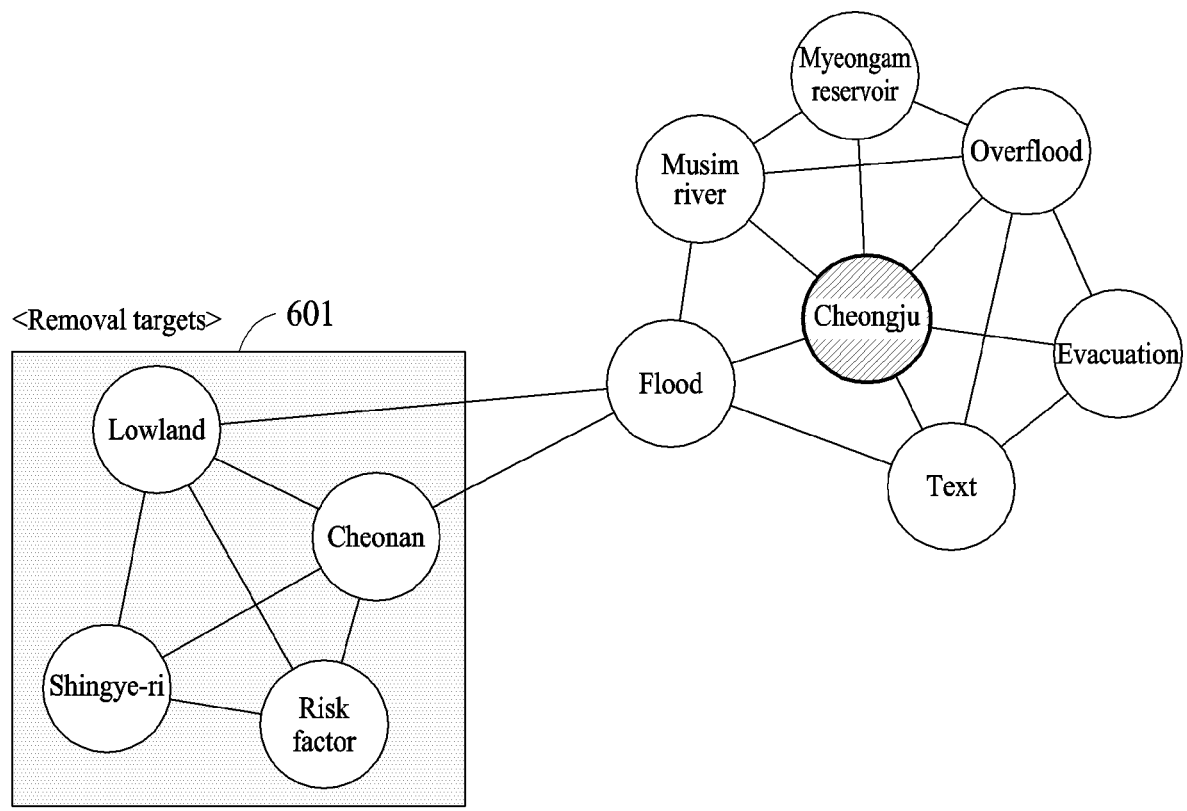

Referring to FIG. 6B, the event detection system may set the vertices 'Cheonan', 'lowland', 'risk factor' and 'Shingye-ri' separate from the center keyword by two hops or more as the removal targets 601.

Figure 6C:
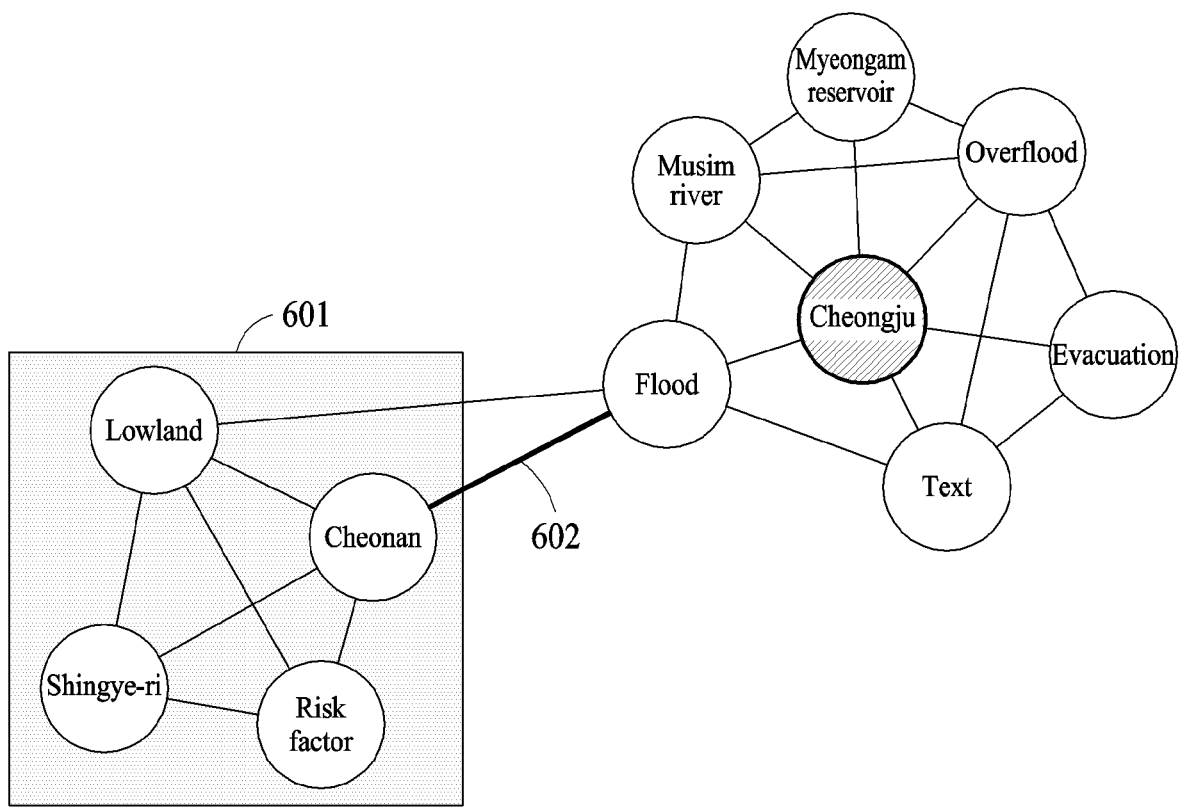
Figure 6D:
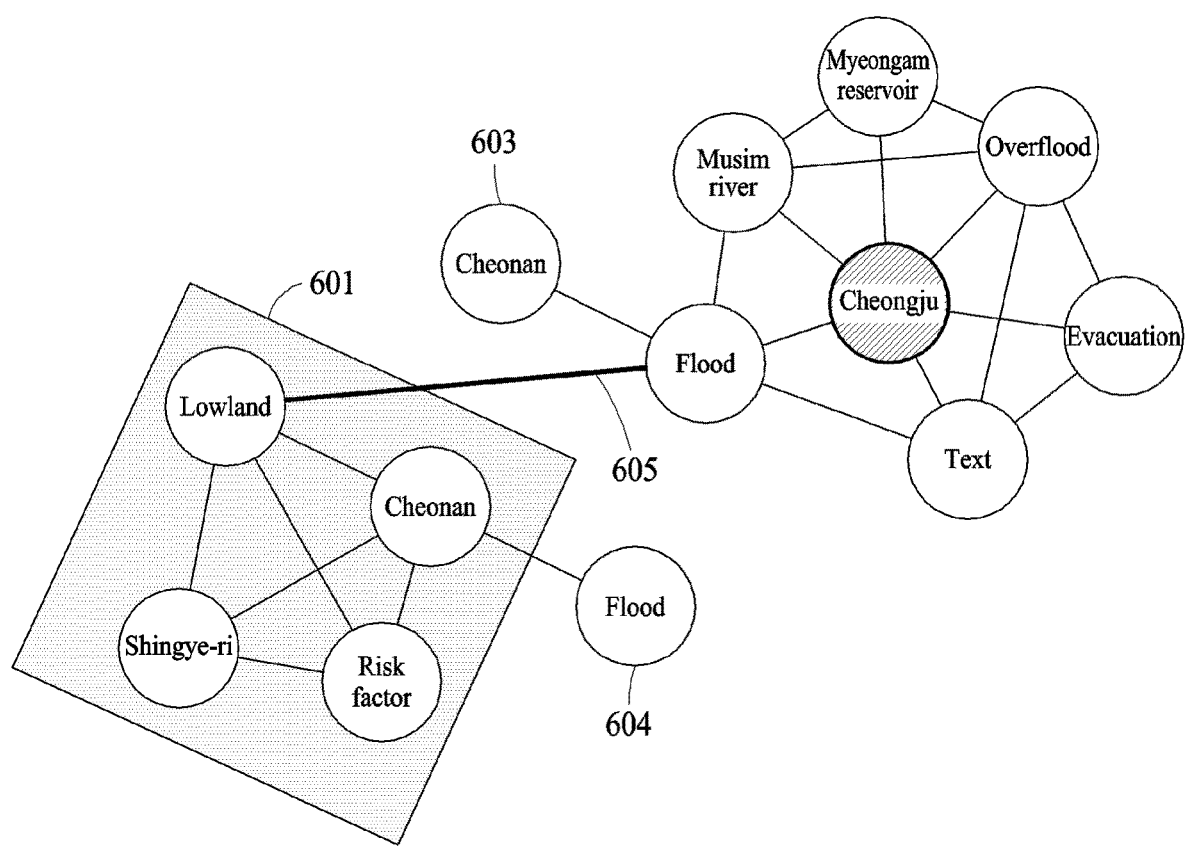

Referring to FIGS. 6C and 6D, the event detection system may verify the lines 602 and 605 deviated from the reliable section of 95% when normalizing $C^b_{edge}$ of each line in the keyword graph 610 and may verify the presence of the different clusters 620 and 630.

The lines 602 and 605 each connecting the two clusters 620 and 630 are included as paths that need to go through when generating a shortest path in the keyword graph 610 and thus, have a relatively high value.

The event detection system may initially cut the line 602 in descending order of $C^b_{edge}$ and may connect, using a line, the vertices 603 and 604 duplicated from the two vertices 'flood' and 'Cheonan' disconnected by cutting.

That is, the event detection system may generate a line for the vertex 'flood' and may connect the vertex 'flood' to the vertex 603 duplicated from the vertex 'Cheonan' using the generated line, and may generate a line for the vertex 'Cheonan' and may connect the vertex 'Cheonan' to the vertex 604 duplicated from the vertex 'flood' using the generated line.

Figure 6E:
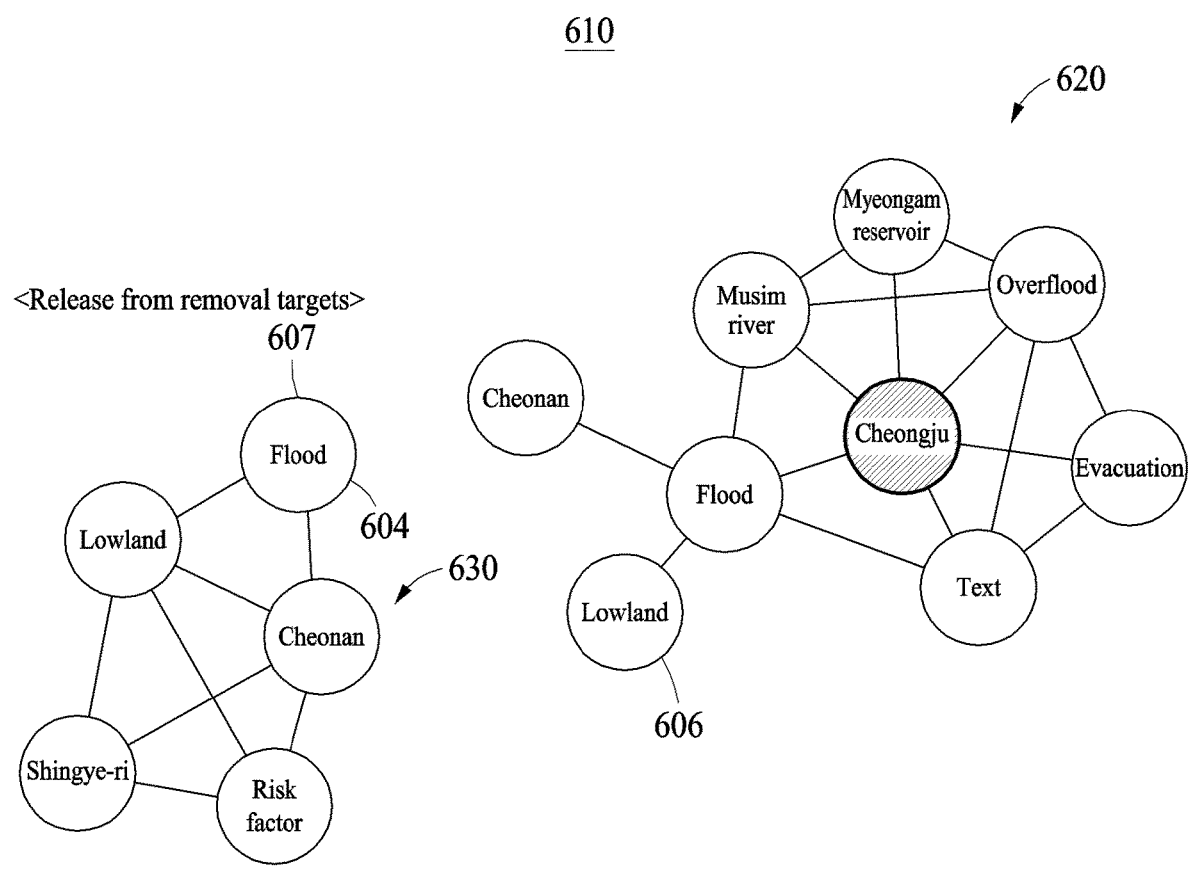

Likewise, referring to FIG. 6E, the event detection system may cut the line 605 and may connect the vertex 'flood' to a vertex 606 duplicated from the vertex 'lowland' using a line and may connect the vertex 'lowland' to a vertex 607 duplicated from the vertex 'flood' using a line.

Referring to FIG. 6E illustrating clustering, the vertex 'Cheongju' set as the center keyword and the vertices set as the removal targets 601 are present in the different clusters 620 and 630. Therefore, the event detection system may return each of the two clusters 620 and 630 as the candidate graph.

Figure 7C:
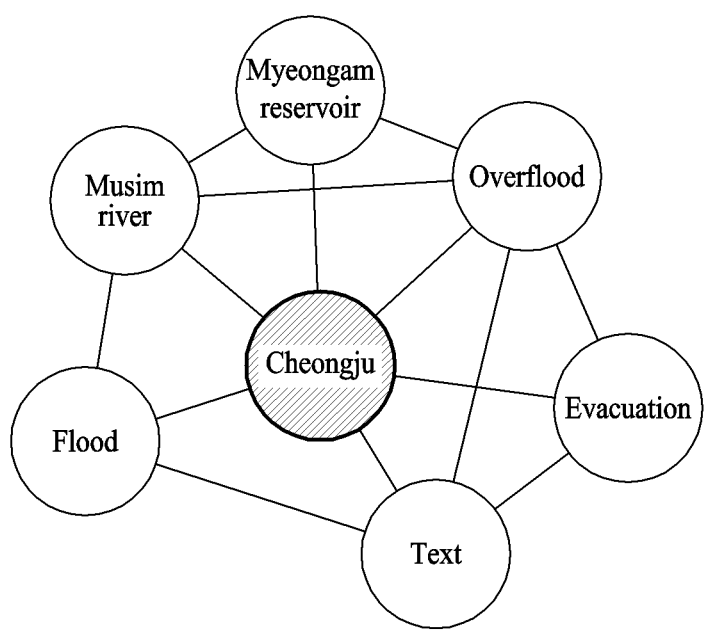

FIGS. 7A to 7C illustrate examples of a process of verifying a plurality of candidate graphs in an event detection system according to an example embodiment.

Referring to FIGS. 7A to FIG. 7C, the event detection system may perform verification with respect to the clusters 620 and 630 of FIG. 6E.

The event detection system may set the vertex 'Cheongju' having the highest $C^b_{vertex}$ as the center keyword in the cluster 620 of FIG. 6E.

Referring to FIG. 7A, the event detection system may perform the verification by grouping, as a pair, every two of the vertices 'flood', 'Musim river', 'Myeongam reservoir', 'overflood', 'evacuation', and 'text' present within a single hop from the center keyword and by verifying whether the vertices simultaneously appear in social data.

For example, the event detection system may group, as a pair, every two vertices based on the vertex ('flood') among the vertices within a single hop, such as {(flood, Musim river), (flood, Myeongam reservoir), (flood, overflood), (flood, text)} and may verify whether the corresponding vertices simultaneously appear in the social data.

Likewise, the event detection system may group, as a pair, every two vertices based on another vertex, for example, 'Musim river', among the vertices within the single hop and may accumulate and count a simultaneous appearance frequency in the social data.

The event detection system may maintain a pair having a simultaneous appearance frequency greater than or equal to a threshold, for example, 30%, within a cluster and may remove a pair having a simultaneous appearance frequency less than the threshold from the cluster.

Referring to FIG. 7B, the event detection system may perform the verification by verifying a simultaneous appearance frequency with respect to vertices within two hops from the center keyword.

The event detection system may find a shortest path to the center keyword 'Cheongju' based on the vertex 'Cheonan' and may verify whether the vertex 'Cheonan' simultaneously appears in social data with respect to all the vertices 'flood' and 'Cheongju' that are included in the shortest path.

The event detection system may verify that the vertex 'Cheonan' and the vertex 'flood' simultaneously appear since a line is present therebetween, however, may verify that the vertex 'Cheonan' and the center keyword 'Cheongju' do not simultaneously appear since there is no line therebetween. Accordingly, the event detection system may remove, from the cluster, the vertex 'Cheonan' that does not satisfy a condition.

Likewise, the event detection system may find a shortest path to the center keyword 'Cheongju' based on the vertex 'lowland' and may verify whether the vertex 'lowland' simultaneously appears in the social data with respect to all of the vertices 'flood' and 'Cheongju' that are included in the shortest path.

The event detection system may verify that the vertex 'lowland' and the vertex (Cheongju) do not simultaneously appear since there is no line therebetween and may remove, from the cluster, the vertex 'lowland' that does not satisfy the condition.

The event detection system may perform verification by iteratively performing the process with respect to vertices within two hops from the center keyword and may return the cluster of FIG. 7C as a candidate graph.

The event detection system may determine the event graph among a plurality of candidate graphs acquired through the verification process. Accordingly, it is possible to enhance the reliability and accuracy of event graph detection.

Hereinafter, an operation of the event detection system 100 according to example embodiments is described.

Figure 8:
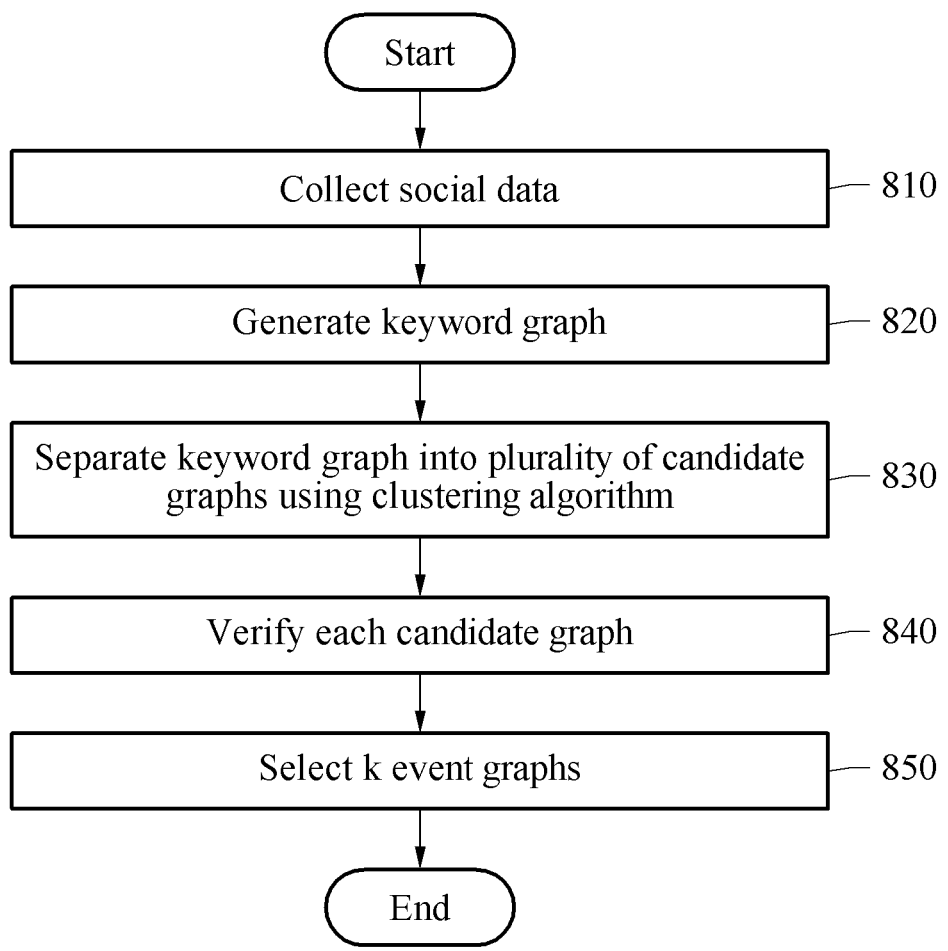
FIG. 8 is a flowchart illustrating an example of a method of detecting a graph-based event in a social network according to an example embodiment.

FIG. 8 is a flowchart illustrating an example of a method of detecting a graph-based event in a social network according to an example embodiment.

The event detection method of FIG. 8 may be performed by the event detection system 100.

Referring to FIG. 8, in operation 810, the event detection system 100 collects social data from a social network system.

In operation 820, the event detection system 100 generates a keyword graph based on the collected social data.

In operation 830, the event detection system 100 separates the keyword graph into a plurality of candidate graphs using a clustering algorithm.

In operation 840, the event detection system 100 verifies each of the plurality of candidate graphs by verifying whether a corresponding vertex and a neighboring vertex thereof simultaneously appear in the social data with respect to each of vertices constituting a candidate graph.

In operation 850, the event detection system 100 selects and determines k candidate graphs from among the plurality of candidate graphs as an event graph by considering a user interest that is calculated based on a per-time variation of a social action associated with the social data. Here, k denotes a natural number.

Through the above process, the event detection system 100 may use the user interest as a weight of a graph to detect an event based on the graph in a social network, thereby enhancing the reliability and accuracy of the detected event.

The aforementioned example embodiments may be configured using hardware components, software components, and/or combination of hardware components and software components. For example, the apparatuses, the methods, and the components described in the example embodiments may be configured using one or more general-purpose or special purpose computers, such as, for example, a processor, a controller, a central processing unit (CPU), a graphics processing unit (GPU), an arithmetic logic unit (ALU), a digital signal processor, a microcomputer, a field programmable gate array (FPGA), a programmable logic unit (PLU), a microprocessor, an application specific integrated circuit (ASICS), or any other device capable of responding to and executing instructions in a defined manner.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claim.

What is claimed is:

1. A method of detecting a graph-based event in a social network, the method comprising:
    generating a keyword graph using a processor based on social data collected from a social network system stored in memory;
    separating the keyword graph into a plurality of candidate graphs through clustering using the processor;
    verifying each of the plurality of candidate graphs using the processor by verifying whether a corresponding vertex and a neighboring vertex thereof simultaneously appear in the social data with respect to each of vertices of a candidate graph, wherein for each of the plurality of candidate graphs, the verifying further includes:
        selecting a word that matches a vertex having a highest betweenness central attribute value from the candidate graph as a center keyword;
        verifying whether vertices within a desired number of hops from the center keyword simultaneously appear in the social data, while increasing the number of hops; and
        verifying the candidate graph by maintaining simultaneously appearing vertices in the candidate graph and removing non-simultaneously appearing vertices from the candidate graph;
    calculating a user interest for each of the verified plurality of candidate graphs based on a per-time variation of a social action associated with the social data using the processor;
    determining k candidate graphs among the verified plurality of candidate graphs as an event graph based on the user interest, wherein k denotes a natural number using the processor; and
    selecting a candidate graph to be determined as the event graph from among the k candidate graphs using the processor.

2. The method of claim 1, further comprising:
    collecting, from the social network system, a number of social actions representing sympathy associated with social data in which words matching two vertices in the candidate graph simultaneously appear during a first time,
    wherein the calculating of the user interest comprises calculating a variation in the number of social actions during the first time based on a number of social actions during a second time that is a previous time of the first time, and calculating the user interest for each of the words matching the two vertices based on the calculated variation.

3. The method of claim 2, wherein the calculating of the user interest comprises counting a frequency the words matching the two vertices simultaneously appear and calculating the user interest by further using the frequency.

4. The method of claim 2, further comprising:
assigning the calculated user interest as a weight to a line that connects the words in the candidate graph;
calculating an event detection coefficient for each candidate graph by adding up weights assigned to all the lines of the candidate graph; and
selecting k top candidate graphs from among candidate graphs that are sorted in descending order of the event detection coefficient.

5. The method of claim 1, wherein the generating of the keyword graph comprises:
preprocessing the social data and removing, from the social data, a word that belongs to a special character, a uniform resource locator (URL), a postposition, a newly-coined word, an adverb, or a word that does not satisfy a predetermined appearance frequency; and
generating the keyword graph by matching at least one of a noun and a verb root extracted through processing to a vertex and by connecting the vertices using a line based on whether words matching the vertices simultaneously appear.

6. The method of claim 1, further comprising:
calculating all the shortest paths available between two vertices among vertices of the keyword graph; and
calculating a ratio of shortest paths passing through a specific vertex among all the shortest paths as a first betweenness central attribute value of the specific vertex, and
the separating comprises:
selecting a word that matches a vertex having a highest first center attribute value in the keyword graph as a center keyword;
separating the keyword graph into a first candidate graph including a vertex that matches the center keyword and a vertex that is connected thereto using a line and a second candidate graph excluding the first candidate graph; and
separating the second candidate graph into one or more candidate graphs by iteratively performing the selecting and the separating with respect to the second candidate graph.

7. The method of claim 6, further comprising:
calculating a ratio of shortest paths passing through a specific line among all the shortest paths as a second betweenness central attribute value of the specific line,
wherein the separating comprises removing, from the keyword graph, a line having the calculated second betweenness central attribute value greater than a threshold in descending order of the second betweenness central attribute value and returning the keyword graph from which the line is removed as one of the plurality of candidate graphs.

8. A system for detecting a graph-based event in a social network, the system comprising:
a processor and memory, the processor to execute the following:
a generator configured to generate a keyword graph based on social data collected from a social network system;
a clustering engine configured to separate the keyword graph into a plurality of candidate graphs through clustering;
a verifier configured to verify each of the plurality of candidate graphs by verifying whether a corresponding vertex and a neighboring vertex thereof simultaneously appear in the social data with respect to each of vertices of a candidate graph, wherein for each of the plurality of candidate graphs, the verifier is further configured to:
select a word that matches a vertex having a highest betweenness central attribute value from the candidate graph as a center keyword;
verify whether vertices within a desired number of hops from the center keyword simultaneously appear in the social data, while increasing the number of hops; and
verify the candidate graph by maintaining simultaneously appearing vertices in the candidate graph and removing non-simultaneously appearing vertices from the candidate graph;
a calculator configured to calculate a user interest for each of the verified plurality of candidate graphs based on a per-time variation of a social action associated with the social data; and
a determiner configured to determine k candidate graphs from among the verified plurality of candidate graphs as an event graph based on the user interest, wherein k denotes a natural number, the determiner further configured to select a candidate graph to be determined as the event graph from among the k candidate graphs.

9. The system of claim 8, further comprising:
a collector configured to collect, from the social network system, a number of social actions representing sympathy associated with social data in which words matching two vertices in the candidate graph simultaneously appear during a first time,
wherein the calculator is configured to calculate a variation in the number of social actions during the first time based on a number of social actions during a second time that is a previous time of the first time, and to calculate the user interest for each of the words matching the two vertices based on the calculated variation.

10. The system of claim 8, further comprising:
an operator configured to calculate all the shortest paths available between two vertices among vertices of the keyword graph, and to calculate a ratio of shortest paths passing through a specific vertex among all the shortest paths as a first betweenness central attribute value of the specific vertex,
wherein the clustering engine is configured to select a word that matches a vertex having a highest first center attribute value in the keyword graph as a center keyword, to separate the keyword graph into a first candidate graph including a vertex that matches the center keyword and a vertex that is connected thereto using a line and a second candidate graph excluding the first candidate graph, and to separate the second candidate graph into one or more candidate graphs in response to selecting the center keyword.

11. The system of claim 10, wherein the operator is configured to calculate a ratio of shortest paths passing through a specific line among all the shortest paths as a second betweenness central attribute value of the specific line, and the clustering engine is configured to remove, from the keyword graph, a line having the calculated second betweenness central attribute value greater than a threshold in descending order of the second betweenness central attribute value and to return the keyword graph from which the line is removed as one of the plurality of candidate graphs.

\* \* \* \* \*